United States Patent [19]
Farfaglia

[11] 4,085,664
[45] Apr. 25, 1978

[54] UNIVERSAL MANDREL FOR CONTAINER FORMING APPARATUS

[75] Inventor: Silvio T. Farfaglia, Fulton, N.Y.

[73] Assignee: Phillips Petroleum Company, Bartlesville, Okla.

[21] Appl. No.: 723,396

[22] Filed: Sep. 15, 1976

[51] Int. Cl.² .............................................. F01B 19/00
[52] U.S. Cl. ................................................ 93/44.1 R
[58] Field of Search .................... 93/12 R, 39.2, 39.3, 93/36.1, 44, 44.1 R, 44.1 GT, 59 R, 59 CE, 59 ES, 59 PL, 59 MT

[56] References Cited
U.S. PATENT DOCUMENTS

| | | | |
|---|---|---|---|
| 1,755,513 | 4/1930 | Newton et al. | 93/39.2 |
| 2,369,205 | 2/1945 | Balton | 93/79 |
| 3,958,501 | 5/1976 | Richards | 93/44.1 R |

*Primary Examiner*—Gerald A. Dost

[57] ABSTRACT

Means are disclosed which allow one to quickly modify the circumferential dimension or shape of the container that can be formed by an apparatus which forms a tubular container by first clamping a flat blank of sheet material against a basic mandrel with a clamping means and then folding the thus clamped blank around the mandrel sleeve. Also disclosed is an apparatus including that means, which apparatus can be easily modified to form tubular containers of various circumferential dimensions or shapes from flat blanks of sheet material.

11 Claims, 4 Drawing Figures

UNIVERSAL MANDREL FOR CONTAINER FORMING APPARATUS

BACKGROUND OF THE INVENTION

This invention relates to machines for making tubular containers from flat blanks of sheet material. In another aspect this invention relates to machines easily adaptable for making more than one size of tubular containers from appropriately sized flat blanks of sheet material. In yet another aspect this invention relates to means which allow one to quickly modify the circumferential dimension or shape of the container that can be formed by a machine that forms tubular containers from flat blanks of sheet material. Further the invention relates to mandrel means employed as the forming surface in producing tubular containers from flat blanks or sheet material.

Tubular containers are often made from flat blanks by wrapping a blank around a mandrel and sealing the overlapping margins of the blank to form a tubular container side wall. Examples of machines employing mandrels in the formation of tubular containers are provided by A. A. Barnes et al, U.S. Pat. No. 2,726,583, issued Dec. 13, 1955; Paul J. Corazzo, U.S. Pat. No. 3,289,552, issued Dec. 6, 1966; and Silvio T. Farfaglia et al, U.S. Pat. No. 3,890,765, issued June 24, 1975. In using these types of machines, when one desires to produce tubular containers of a different circumferential dimension or shape it has generally been necessary to remove the existing mandrel from its mounting on the machine and to substitute another mandrel which will produce a container having the desired circumferential size or shape. In machines such as illustrated in the above-mentioned patents, the removal of mandrels can be extremely time consuming. Also the replacement of mandrels of one size or shape with those of another size or shape generally necessitates many other adjustments in the overall container forming machine. Thus improvements which will minimize the complexity of adjustments required when such machines are modified to produce containers of a different size or shape will be of significant advantage in this field.

Accordingly, an object of this invention is to provide means whereby one can switch from making containers of one circumferential shape or size to making containers of another circumferential shape or size with less complex adjustments and alterations than required heretofore.

Also it is an object of this invention to provide an assembly which serves as mandrel for forming tubular container of one size and which is easily disassembled to produce a means which can serve as a mandrel for forming tubular container of a smaller size.

Another object of the present invention is to provide an apparatus easily modified for forming tubular containers of various circumferential dimensions or shapes.

Other aspects, objects, and advantages of the present invention will become apparent from a study of the disclosure, the appended claims, and the provided drawings.

In accordance with the present invention a means is provided for quickly modifying the circumferential dimension or shape of the container that can be formed by an apparatus which forms a tubular container by first clamping a flat blank of sheet material against a basic mandrel with a clamping means comprising a basic clamping shoe and a clamping arm capable of moving the clamping shoe from a position which will allow a blank to be placed between the basic clamping shoe and the basic mandrel to a position which can hold a portion of the blank against the basic mandrel and then folding the clamped flat blank around the basic mandrel, wherein the basic mandrel is designed so that the formed tubular container can be slid off said mandrel. The means is a kit comprising (1) at least one tubular mandrel sleeve being designed so that if a tubular container were formed by folding an appropriately sized blank around the mandrel sleeve the thus formed tubular container could be slid off the mandrel sleeve and so that the mandrel sleeve is capable of being removably secured around said basic mandrel in coaxial alignment therewith and (2) a corresponding replacement clamping shoe for each tubular mandrel sleeve, each replacement clamping shoe being of such size that when the corresponding mandrel sleeve is secured around the basic mandrel and the replacement clamping shoe is substituted for the basic clamping shoe, the thus altered clamping means without further modification or adjustment will be able to function to move the replacement clamping shoe from a position which allows a blank to be placed between said replacement clamping shoe and the corresponding mandrel sleeve to a position in which the replacement clamping shoe will hold a blank against the corresponding mandrel sleeve.

Any suitable means can be employed for removably securing the mandrel sleeve around the basic mandrel and assuring coaxial alignment with said basic mandrel. One preferred means involves removably securing to an end of the basic mandrel an end plate which will secure the mandrel sleeve around the basic mandrel by clamping the mandrel sleeve between said end plate and a basic mandrel mounting flange. Other examples of suitable attaching means include at least one countersunk fastening means such as a bolt in the mandrel sleeve that can be attached to a respective threaded portion in the basic mandrel, threaded portions on the interior of one end of the mandrel sleeve which can interlock with corresponding threaded portions on a portion of the basic mandrel mounting sleeve, cooperating lug-and-slot type locking devices on the interior of end of the mandrel sleeve and a portion of the basic mandrel mounting flange, which lug-and-slot devices enable the mandrel sleeve to be slid over the portion of the flange and then twisted to secure the mandrel from thereafter sliding along the length of the basic mandrel.

Preferably the internal diameter of the tubular mandrel sleeve is larger than that necessary for allowing the mandrel sleeve to be removably secured around the basic mandrel. By employing such a mandrel sleeve there is less likelihood for sticking which would inhibit the attachment or subsequent removal of the mandrel sleeve. When such a mandrel sleeve is employed with a basic mandrel connected to a mandrel mounting flange, the coaxial alignment can be provided by suitably arranged indentation means and corresponding projection means on the flange and on the end of the mandrel sleeve that will fit over a portion of the mounting flange when the mandrel sleeve is secured around said basic mandrel. The terms indentation means and projection means are intended to include one or a plurality of suitable indentations as well as suitable continuous cooperating indentation and projection.

When the mandrel sleeve is secured by being clamped between the flange and a removably secured end plate, further assurance that the coaxial alignment will be maintained during the production of tubular containers can be provided by suitable cooperating projection means and indentation means on the end plate and the end of the mandrel sleeve when the two contact.

Also according to the present invention there is provided an apparatus which can be easily altered to produce a container having a different circumferential dimension or shape. The apparatus includes a basic mandrel having first and second ends. The second end of the basic mandrel is attached to a supporting means. The basic mandrel is shaped so that if a flat blank were wrapped around it to form a tube, the thus formed tube could be slid off the first end of the basic mandrel. Surrounding the basic mandrel and in coaxial alignment therewith is a removably secured tubular mandrel sleeve having first and second ends adjacent the respective first and second ends of the basic mandrel. The tubular sleeve is also designed so that if a flat blank were wrapped around it to form a tube, the thus formed tube could be slid off the first end of the mandrel sleeve. Associated with the mandrel sleeve is a clamping means which will allow a flat blank to be placed between itself and the mandrel sleeve and then serve to hold a portion of the flat blank in firm contact with the mandrel sleeve while the flat blank is being folded. The clamping means is adapted so that, if the apparatus were modified by employing a larger mandrel sleeve or by removing the mandrel sleeve to expose the basic mandrel, the clamping means could be adjusted or altered so that it could respectively function to allow a blank to be placed between itself and larger mandrel sleeve and then to hold the flat blank in firm contact with the larger mandrel sleeve while the flat blank was being folded or to allow a blank to be placed between itself and the basic mandrel and then to hold the flat blank in firm contact with the basic mandrel while the flat blank was being folded. Also included in the apparatus is a folding means designed to fold a blank around the mandrel sleeve after the blank has been clamped against the mandrel sleeve and being also adapted or capable of being adjusted to fold a blank at least either around the basic mandrel of the mandrel sleeve if the apparatus were modified by removing the mandrel sleeve or around a larger mandrel sleeve if the apparatus were modified by employing a larger mandrel sleeve.

The present invention and its advantages will be readily understood by referring to the drawings.

Figure 1:
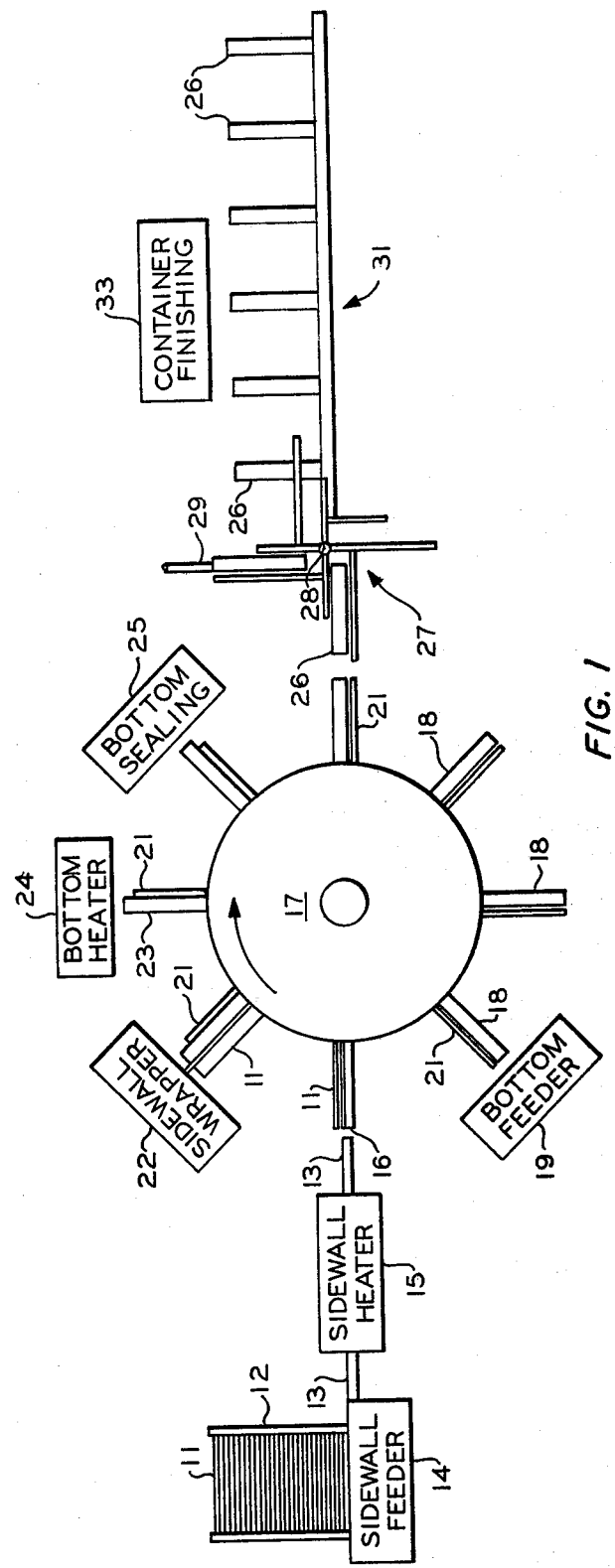
FIG. 1 is a diagrammatic illustration of one type of container forming machine that can employ the features of the present invention.

FIG. 1 is a diagrammatic illustration of one type of machine that can be modified by the present invention. A machine such as disclosed in A. A. Barnes et al, U.S. Pat. No. 2,726,583, issued Dec. 13, 1955 can also be modified by the present invention. With the illustrated machine thermoplastic paperboard sidewall blanks 11 are individually withdrawn from a magazine 12 and transferred to a conveyor 13 by a sidewall blank feeder 14. The blank 11 is passed through sidewall heater 15 to heat to a suitable bonding temperature the thermoplastic coating in the sidewall marginal positions which are to be overlapped in the formation of the sidewall into a container. Turret 17 is mounted for rotation about its horizontal axis and is provided with a plurality of mandrels 18 which extend radially outwardly from said horizontal axis in a vertical plane perpendicular to said horizontal axis. The mandrels 18 are spaced apart on the turret in a uniform manner. A suitable bottom feeder mechanism 19 supplies individual bottom member 16 to the outermost end face of mandrels 18. Each mandrel 18 is provided with suitable means, for example, a suction means, to hold the bottom member 16 in place on the face of the mandrel. The turret rotates stepwise, in a clockwise direction as viewed in FIG. 1, to move a bare mandrel to the bottom of the feeding station to receive a bottom member 16 and then to the horizontal position in alignment with conveyor means 13 to receive a heated blank 11. Each mandrel 18 has a sidewall clamp 21 associated therewith which is in the open position, spaced apart from its mandrel 18, at the sidewall blank receiving station to permit the heated blank 11 to be inserted between the mandrel 18 and the clamp 21 by the conveyor means 13. The clamp 21 is then actuated to secure the median or intermediate portion of the heated blank 11 in position on mandrel 18, after which the turret 17 is indexed to the next position to carry the secured blank 11 and bottom member 16 to the sidewall wrapping station. The sidewall wrapping means 22 wraps the blank 11 around mandrel 18 and applies pressure to the overlapped heated side margins to bond the side margins, thereby forming a tubular sidewall 23.

At the next indexing of turret 17, the mandrel carrying the tubular sidewall 23 is moved from the sidewall wrapping station to the bottom heating station, where the margin of the sidewall adjacent the bottom member 16 is heated by bottom heating means 24 to a suitable bonding temperature. The turret 17 is then heated to transport the mandrel 18 and the heated sidewall 23 to a bottom sealing station, where bottom sealing means 25 applies pressure to the heated portions of the sidewall 23 and bottom member 16 to form the bottom seal. For example, when the bottom member 16 has a shape at least substantially equal to the shape of the end face of mandrel 18, the bottom margin of the tubular sidewall 23 can be folded inwardly into contact with the bottom member 16 to form the bottom seam. A container of this type is illustrated by J. L. Wilcox in U.S. Pat. No. 3,369,726, issued Feb. 20, 1968. Alternatively, when the bottom member 16 has a central disk portion having a diameter substantially equal to the diameter of the end face of mandrel 18 and an annular flange portion folded to extend outwardly from the mandrel 18 at least approximately parallel to the side surface of the mandrel 18, the flange portion of the bottom member can be bonded to the contacting surface of the tubular sidewall 23. If desired, the tubular sidewall bottom margin can be longer than the flange portion of the bottom disk member 16 to permit the sidewall bottom margin to be folded approximately 180° to form a U which contacts both sides of the flange of bottom member 16. Also, if desired, the bottom seal can be rolled by suitable known means. Where the bottom member 16 does have such a flanged portion, the bottom feeder 19 can employ a suction cup transfer mechanism, or flat disks can be chip fed and then forced through a die to form the flange and then applied to the end of mandrel 18 at the bottom feeder station.

After the bottom seal is formed, the turret 17 is indexed to transport the formed container 26 to a stripping station, and the associated clamp 21 is moved to the open position to release the container 26. Any suitable stripping means can be employed to remove the container from the mandrel means 18. A preferred method utilizes pneumatic pressure applied through the mandrel 18 to the inside of the container to eject the container from the mandrel 18 into a pocket of a turret 27. The turret 27 is rotated stepwise about horizontal axis 28 to move the ejected container 26 from the initial horizontal position to a vertical position with the open end up. A pusher arm 29 is moved through the upright pocket of turret 27 to move the container 26 onto conveyor 31 which can transport the produced containers to stations for other desired manipulations, i.e., transferring to a container finishing station 33.

Heretofore, if it was desired to modify a machine of the type illustrated by FIG. 1 to produce tubular containers of a different circumferential size or shape an undesirable amount of disassembly and adjustment would be required. For example, in a machine of the type disclosed in the above mentioned A. A. Barnes et al patent such a modification would involve replacing the basic mandrels with mandrels of a different circumferential size or shape. On such a machine the mandrels are attached to the turret by a mandrel mounting flange. In order to remove the mandrels it is necessary to disconnect the corresponding clamping means because the mandrel flange is surrounded by a portion of the clamping arm of the clamping means. After the original mandrel was replaced with a new one, it would be necessary, if possible, to adjust the clamping means so that it would function properly with the new mandrel. If the clamping means could not be adjusted to function with the new mandrel it would have to be replaced with one which would.

Figure 2:
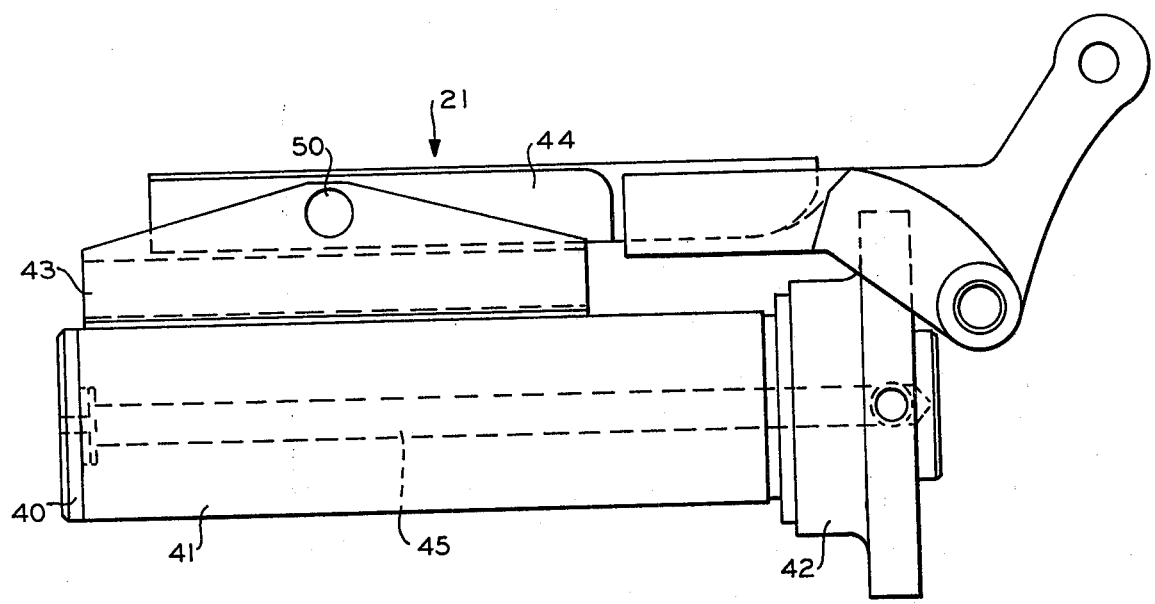
FIG. 2 is a side view of a basic mandrel and a corresponding clamping means including a removable basic clamping shoe.

FIG. 2 is a detailed illustration of a basic mandrel and a clamping means associated therewith. The illustrated basic mandrel 41 is attached or integral with a mounting flange 42 which is employed to mount the mandrel 41 on a mandrel supporting means for example a turret as shown in item 17 in FIG. 1. The illustrated mounting flange 42 contains a pair of continuous stepped portions the function of which will be explained in connection with the following discussion of FIG. 3. Mounted on one end of the basic mandrel 41 is a removable end plate 40. The end plate 40 is useful in providing a forming surface when a bottom is to be applied on the tubular container. The basic mandrel 41 and the end plate 40 each contain a passageway 45 which can be connected to vacuum and pneumatic sources suitable for performing the bottom-member-holding and container-removing functions described in association with the discussion of FIG. 1. The clamping means 21 associated with the basic mandrel comprises a basic clamping shoe 43 removably mounted on a clamping arm 44 by an attaching means, for example, a bolt or removable pin 50. The clamping arm 44 is mounted about pivot pin 46 in such a fashion that it can serve the basic clamping shoe 43 from a point which will allow a blank to be inserted between the basic mandrel 41 and the basic clamping shoe 43 to a position which will hold a portion of the flat blank in contact with the basic mandrel 41. The clamping arm 44 is actuated by an actuating means, not illustrated. A typical suitable clamping arm actuating means is described in the above-mentioned A. A. Barnes et al patent.

Figure 3:
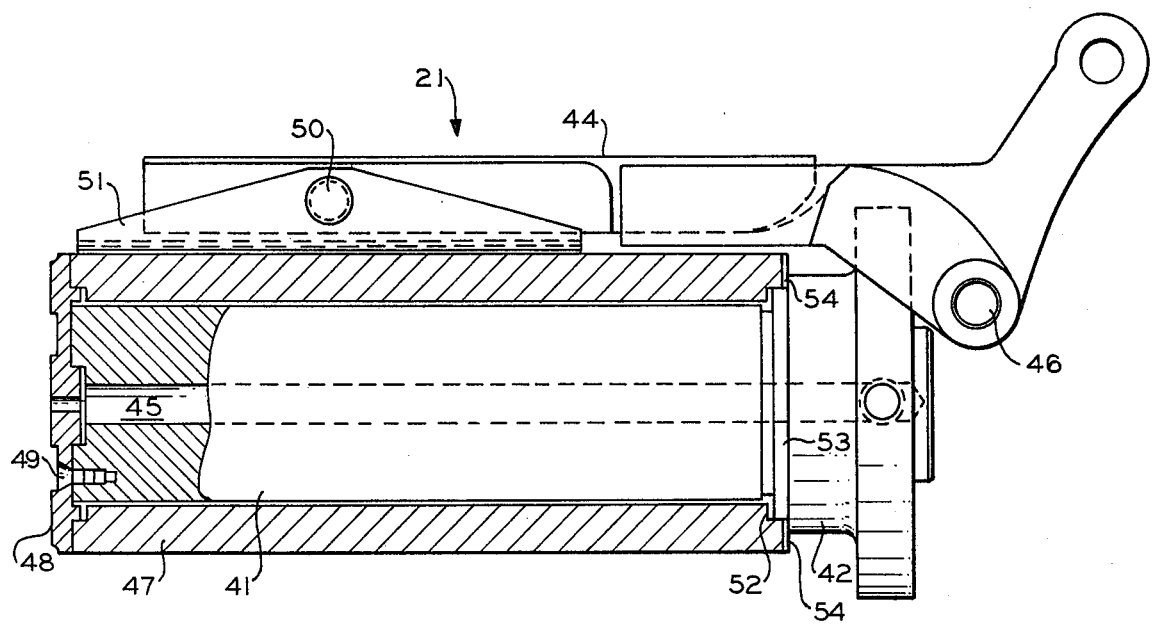
FIG. 3 is a side view with partial cross section illustrating how the means shown in FIG. 2 can be modified by a specific embodiment of the present invention.

FIG. 3 shows how a basic mandrel and clamping means as shown in FIG. 2 can be altered by a specific embodiment of the present invention. In FIG. 3 the basic mandrel 41 is surrounded by a tubular mandrel sleeve 47. The internal diameter of the mandrel sleeve 47 is large enough that the basic mandrel 41 and the mandrel sleeve 47 do not contact. The mandrel sleeve 47 is removably secured around the basic mandrel 41 by an end plate 48 which when removably secured to the end of the basic mandrel 41 clamps the mandrel sleeve between the end plate and the mounting flange 42. The drawing shows one fastening means 49 which removably secures the end plate to the basic mandrel 41. The end of the mandrel sleeve 47 that is in contact with the mounting flange 42 has a continuous indentation 52 on its interior surface which mates with a stepped portion 53 of the mounting flange 42 to assure that the mandrel sleeve is in coaxial alignment with the basic mandrel 41 when engaged with the mounting flange. The end of the mandrel sleeve 47 that contacts the mounting flange 42 is provided with two slots 54 through which a suitable tool can be inserted to aid in removing the mandrel sleeve when desired. The clamping means 21 associated with the mandrel sleeve 47 includes the clamping arm 44 and a replacement clamping shoe 51 connected to the clamping arm 44 by the fastening means 50. The replacement clamping shoe is sufficiently smaller than the basic clamping shoe shown as 43 in FIG. 2 that the clamping means as shown in FIG. 3 without any adjustment of the angle of pivot about pivot point 46 will be able to receive a blank and then clamp the blank against the mandrel sleeve 47 for folding.

Figure 4:
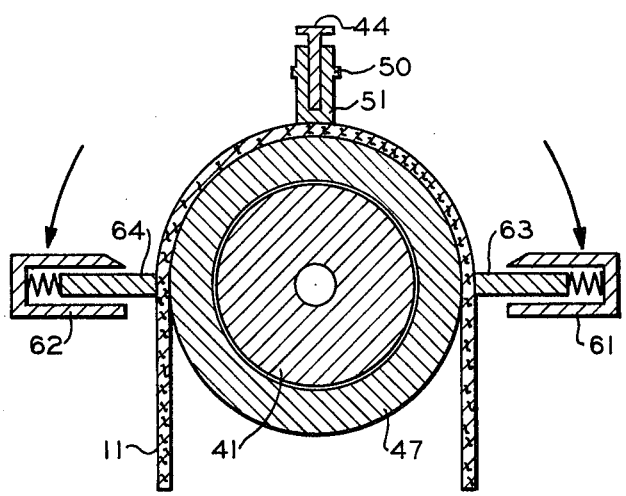
FIG. 4 is a cross-sectional end view of an embodiment of the present invention illustrating the cooperation of the mandrel sleeve, the clamping means, and the folding means in an apparatus which produces tubular containers by folding a blank to form a tube. In the respective drawings identical numbers refer to identical features.

FIG. 4 is a cross-sectional end view illustrating how the basic mandrel, the mandrel sleeve, the clamping means, and the folding means of an apparatus cooperate to fold flat blanks to produce tubular containers. A paperboard blank 11 is shown being held against the mandrel sleeve 47 by clamping shoe 51 while a folding means wraps the blank around the mandrel sleeve 47. The folding means illustrated comprises a pair of folding wings 61 and 62 each having a wiping blade resiliently mounted thereto, 63 and 64, respectively.

In operation after a blank 11 has been placed between the clamping shoe 51 and the mandrel sleeve 47 the clamping shoe 51 is engaged to hold the blank 11 against the mandrel sleeve 47 and then the following wings 61 and 62 are rotated around the longitudinal axis of the basic mandrel in opposite directions such that the wiping blades 63 and 64 contact the blank 11 and wrap it around the mandrel sleeve to cause the sidewall margin portions of the blank 11 to overlap. The actuation mechanism for rotating the folding wings around the mandrel can be any suitable means. An example of a suitable mechanism and its operation is disclosed in Frank P. Richards' U.S. Pat. No. 3,958,501 issued May 28, 1976. The disclosure of that patent is incorporated herein by reference. Preferably in a folding means of the type just described, one folding wing has associated therewith a sealing head not illustrated, for example, as disclosed in the just mentioned Richards patent. As previously stated a preferred embodiment of the present invention includes a container forming apparatus having folding means that is adapted or capable of being adjusted to at least fold a blank around the basic mandrel if the apparatus were modified by removing the mandrel sleeve or around a larger mandrel sleeve if the apparatus were modified by employing a larger mandrel sleeve. With folding means as illustrated in FIG. 4 the realization of this embodiment of the present invention can be provided by designing the folding wings and the wiping blades so that the wiping blades could shift relative to the folding wings a sufficient distance to function with either the basic mandrel or the larger mandrel sleeves as well as with the mandrel sleeve illustrated. Of course, in an especially preferred embodiment the folding wings and wiping blades could be designed so that they could function with the basic mandrel if no mandrel sleeve were employed or with each of a plurality of mandrel sleeves if mandrel sleeves of different sizes were employed. It should be recognized that instead of resiliently connecting the wiping blades and the respective folding wings, various mechanical means could be employed for altering the position of the wiping blades relative to the folding wings so that they could be employed to fold containers larger or smaller than those that can be produced upon the one illustrated mandrel sleeve. For example, each wiping blade can be connected to its corresponding folding wing by screw means or gear means which can be actuated to alter the position of the wiping blade relative to its folding wing.

While the drawings illustrate an apparatus can be designed that is easily adaptable for forming cylindrical tubular containers of various circumferential dimensions, also within the scope of the present invention is an apparatus easily adaptable for forming tubular containers of various circumferential shapes. For example, by employing a mandrel sleeve having a rectangular external transverse cross section and a basic mandrel having a circular external transverse cross section one would have an apparatus easily adaptable for producing containers having rectangular or circular circumferences. Further the mandrel sleeve and/or the basic mandrel could have a frusto-conical configuration. The external cross section of the mandrel sleeve and the mandrel core can be of any suitable shape and can be of the same or different shapes. Also, to produce a larger container it is not necessary that a smaller mandrel sleeve be removed from the core and replaced by a larger mandrel sleeve. Instead, it is within the scope of equivalent of this invention to simply employ a mandrel sleeve that can be removably secured around a smaller mandrel sleeve that is removably secured around the basic mandrel.

While it has been indicated that the present invention can be useful in a container forming machine of the type illustrated by FIG. 1, this by no means is intended to indicate that the invention is only applicable in such machines. Thus, while the machine as described in FIG. 1 forms containers with bottoms and bonds the sidewalls by heat activating portions of thermoplastic coated blanks, the present invention is equally adaptable to machines which form containers that do not have bottoms and to machines in which the sidewalls are bonded by applied adhesive or even by mechanical fastening means. Likewise, while the machine described in FIG. 1 employs a plurality of forming mandrels on a rotating turret, the instant invention also includes within its scope an apparatus employing only one forming mandrel which is simply attached to a supporting means. Further the present invention includes within its scope apparatus employing folding means which differ from those illustrated in FIG. 4.

What is claimed is:

1. A kit for quickly modifying the circumferential dimension or shape of the container that can be formed by an apparatus which forms a tubular container by first clamping a flat blank of sheet material against a basic mandrel with a clamping means comprising a basic clamping shoe and a clamping arm capable of moving the basic clamping shoe from a position which allows a blank to be placed between the basic clamping shoe and the basic mandrel to a position which holds a portion of the blank so positioned against the basic mandrel and then folding the thus clamped blank around said basic mandrel with a folding means, said kit comprising (1) at least one tubular mandrel sleeve being designed so that if a tubular container were formed by folding an appropriately sized blank around said mandrel sleeve the thus formed tubular container could be slid off the mandrel sleeve and so that the mandrel sleeve is capable of being removably secured around said basic mandrel in coaxial alignment therewith, wherein the internal diameter of the tubular mandrel sleeve is larger than that necessary to allow the mandrel sleeve to be removably secured around the basic mandrel and the mandrel sleeve contains in one end thereof indentation means corresponding to a projection portion of a flange to which the basic mandrel is mounted so that when said mandrel sleeve is placed over said basic mandrel said indentation means can mate with said portion of said flange to insure that the mandrel sleeve is in coaxial alignment with said basic mandrel, and (2) a corresponding replacement clamping shoe for the respective mandrel sleeve, each replacement shoe being of such size that when the corresponding mandrel sleeve is secured around said basic mandrel and the respective replacement clamping shoe is substituted for said basic clamping shoe the thus altered clamping means without further substantial adjustment or modification will be able to function to move said replacement clamping shoe from a position which allows a blank to be placed between said replacement shoe and said mandrel sleeve to a position in which the replacement clamping shoe will hold a blank against the corresponding mandrel sleeve.

2. A kit according to claim 1 including an end plate removably securable to the end of the basic mandrel opposite the end attached to the mounting flange; said end plate being designed so that when the mandrel sleeve is placed around the basic mandrel, the securing of the end plate to the end of the basic mandrel opposite the end attached to the mounting flange clamps the mandrel sleeve in place in coaxial alignment with said basic mandrel between said mandrel flange and said end plate.

3. A kit according to claim 2 wherein said end plate has a projection means which when said end plate is secured to said end of said basic mandrel will surround but not touch a portion of the exterior circumference of the basic mandrel at that end of said basic mandrel; and the mandrel sleeve has, in the end opposite the end adapted to interact with the mounting flange, a second indentation means corresponding to the projection means on the end plate so that when said end plate clamps said mandrel sleeve in place the projection means on the end plate and the second indentation means on the mandrel sleeve cooperate to provide further assurance that in use the mandrel sleeve will not slip out of coaxial alignment with the basic mandrel.

4. A mandrel means capable of functioning as the forming surface for producing a tubular container from a flat blank of sheet material, said means comprising a basic mandrel, a tubular mandrel sleeve, and means for removably securing said mandrel sleeve around and in coaxial alignment with said basic mandrel, wherein the internal diameter of the tubular mandrel sleeve is larger than the corresponding external diameter of said basic mandrel, and wherein one end of said basic mandrel is attached to or integral with a mounting flange, one end of the mandrel sleeve abuts the mounting flange, and the coaxial alignment of the mandrel sleeve and the basic mandrel is provided by cooperating projection and indentation means on the end of the mandrel sleeve and the mounting flange in the area where the mandrel sleeve and the mounting flange abut.

5. A mandrel means according to claim 4 including an end plate removably secured to the end of the basic mandrel that is opposite the end adjacent the mounting flange, said end plate touching the end of the mandrel sleeve that is opposite the end adjacent the mounting flange in such a fashion that the mandrel sleeve is clamped between the end plate and the mounting flange.

6. A mandrel means according to claim 5 wherein there are cooperating projection and indentation means on the end of the mandrel sleeve and the end plate where they abut.

7. A mandrel means according to claim 6 wherein the projection and indentation means in the area of abutment of the mandrel sleeve and the mounting flange comprises a continuous indentation in that end of the mandrel sleeve and a corresponding continuous projection on the mounting flange, and wherein the projection and indentation means in the area of abutment of the mandrel sleeve and the end plate comprises a continuous indentation in that end of the mandrel sleeve and a corresponding continuous projection on the end plate.

8. An apparatus easily adaptable for forming tubular containers of various circumferential dimensions or shapes from flat blanks of sheet material comprising a basic mandrel; a basic mandrel supporting means to which a first end of the basic mandrel is attached; a tubular mandrel sleeve removably secured around and in coaxial alignment with the basic mandrel; said basic mandrel and said mandrel sleeve each being designed so that if a flat blank were wrapped around either to form a tube the tube could be slid off the end of said mandrel sleeve or said basic mandrel that is opposite the end adjacent the basic mandrel supporting means; a clamping means capable of allowing a blank to be placed between itself and the mandrel sleeve and then moving to hold a portion of the flat blank in firm contact with the mandrel sleeve for folding, said clamping means also being capable of being adjusted or altered so that if the apparatus were modified by employing a larger mandrel sleeve or by removing the mandrel sleeve the clamping means could respectively function to allow a blank to be placed between itself and the larger mandrel sleeve and then hold a portion of the blank in contact with the mandrel sleeve for folding or to allow a blank to be placed between itself and the basic mandrel and then hold a portion of the blank in contact with the basic mandrel for folding; and a folding means capable of wrapping a flat blank around said mandrel sleeve and also being adapted or capable of being adjusted to also at least either fold a blank around the basic mandrel if the apparatus were modified by removing the mandrel sleeve or around a larger mandrel sleeve if the apparatus were modified by employing a larger mandrel sleeve; wherein said mandrel sleeve has an internal diameter larger than that necessary to allow the mandrel sleeve to be removably secured around the basic mandrel and the mandrel sleeve contains in one end thereof indentation means cooperating with a projection portion of a flange to which the basic mandrel is mounted to insure that the mandrel sleeve is in coaxial alignment with said basic mandrel.

9. An apparatus according to claim 8 wherein said clamping means comprises a clamping shoe removably attached to a clamping arm which is adapted to move said clamping shoe from an open position allowing the insertion of a blank between the clamping shoe and the mandrel sleeve to a position which will hold a portion of a blank in contact with said tubular sleeve.

10. An apparatus according to claim 9 wherein said folding means comprises first and second folding wings each having wiping blades which will contact and wrap a blank around said mandrel sleeve when the folding wings are rotated in opposite directions around the longitudinal axis of the basic mandrel, said folding wings and said wiping blades being designed so that the wiping blades can be moved relative to the folding wings to also at least either fold a blank around the basic mandrel if the apparatus were modified by removing the mandrel sleeve or around a larger mandrel sleeve if the apparatus were modified by employing a larger mandrel sleeve.

11. An apparatus according to claim 10 wherein the basic mandrel supporting means is a turret which is connected to an actuating means which rotates the turret to cause said basic mandrel and associated mandrel sleeve to be passed through a series of positions where different manipulations can take place and wherein the clamping means is located at one of those positions.

* * * * *